May 27, 1952   J. L. FIHE ET AL   2,598,158
APPARATUS FOR MAKING V BELTS
Filed Aug. 26, 1947
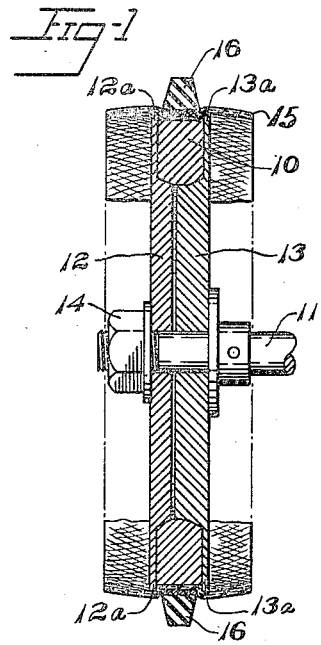
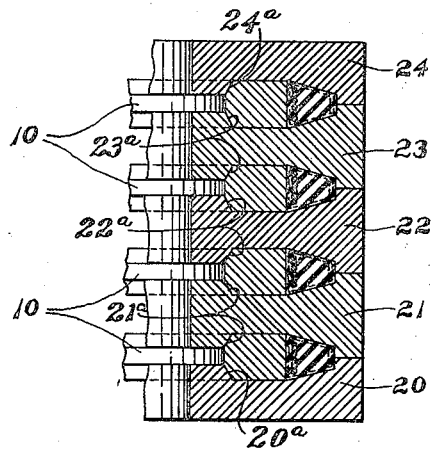
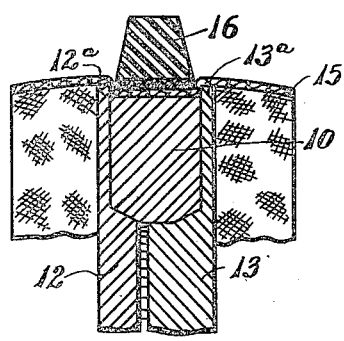
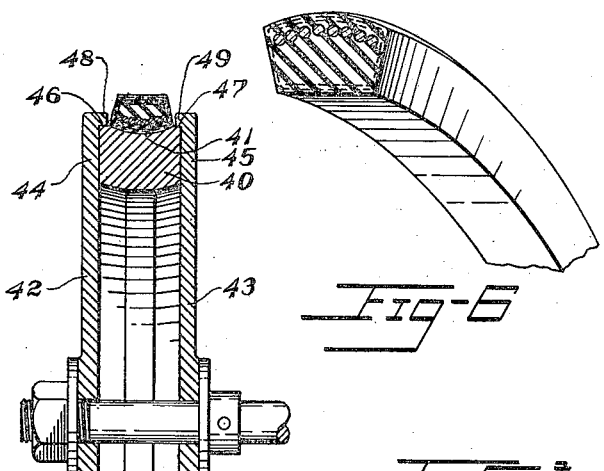
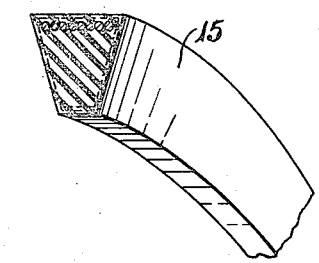
Inventors
John L. Fihe
James W. Huff Patented May 27, 1952

2,598,158

UNITED STATES PATENT OFFICE 2,598,158

APPARATUS FOR MAKING V BELTS

John L. Fihe, Akron, Ohio, and James W. Huff, Mercerville, N. J., assignors to The B. F. Goodrich Company, New York, N. Y., a corporation of New York Application August 26, 1947, Serial No. 770,600

6 Claims. (Cl. 154—3)

This invention relates to the manufacture of V-belts and is especially useful in the manufacture of V-belts having a layer of inextensible tension members.

In the manufacture of V-belts it has been found desirable to provide a tension layer of substantially inextensible tension members, such as cords of cotton, nylon, or rayon, or metallic wires or wire cables located in the outer wider portion of the belt, and a body of resilient rubber or other rubber-like material inwardly of the tension members to provide a compression portion of the belt.

Heretofore, in the manufacture of such belts it has been the practice to wind the resilient rubber-like material for the compression portion of the belt about a collapsible drum, and then to wind thereupon the cords or wires for providing the tension layer. Usually a drum of great axial length has been provided and the materials have been wound thereon throughout its extent and then have been cut to provide separate belt bodies which after being individually enclosed by a covering of bias laid square woven rubberized fabric are stretched about molds such as the molds of the Waner Patent No. 1,748,626. Difficulties have heretofore been experienced in so manufacturing V-belts, probably due to the fact that the tension material both during assembly upon the drum and during molding and vulcanization of the belt has been supported by soft, highly deformable material of considerable depth in more or less floating relation, and has been readily displaced from its desired position both during assembly and during vulcanization. Such displacement of the tension material has resulted in unequal strain upon individual tension members, some of which has been subjected to heavy overloading while others have carried substantially no load.

It has been proposed to form V-belts with a layer of tension members arranged in a laterally bowed layer in which the tension members near the side driving faces would be of less circumference than the tension members therebetween. This presents even greater difficulties in maintaining the proper disposition of the cords due to flow of the deformable material thereunder both during assembly and vulcanization of the belts.

The present invention has for an object to overcome the foregoing and other difficulties in the manufacture of V-belts.

Other objects are to provide accurate positioning of the tension members during assembly of the belt, to provide maintenance of dimensions of the belt from assembly to cure, to avoid distortion of the belt due to handling and storage between assembly and cure, to provide against distortion due to shrinkage of the tension members during the process of construction, and generally to provide greater belt life and uniformity of performance.

These and other objects will appear from the following description and the accompanying drawings.

Of the drawings,

Fig. 1 is an axial sectional view of a building form with a belt thereon under construction and a supporting arbor, all constructed in accordance with and embodying the invention.

Fig. 2 is a similar view of the completely assembled belt on the building form removed from the supporting mandrel.

Fig. 3 is a sectional view of a vulcanizing mold with the belts and building forms assembled therein.

Fig. 4 is a perspective view of a section of the completed belt.

Fig. 5 is a view similar to Fig. 1 showing a modification of the belt and the building form.

Fig. 6 is a view similar to Fig. 4 showing a completed belt resulting from the use of the form of Fig. 5.

Fig. 7 is a sectional view similar to the upper portion of Fig. 1 showing the building form with the belt thereon under construction to a larger scale, other portions being broken away.

According to the invention a belt is built upon an individual former in inside out condition and is retained upon the former during vulcanization, mold members having mating mold cavities for receiving the former and the belt being provided to completely confine the belt while it is vulcanized in reversed or inside out condition.

Referring to the drawings, the numeral 10 designates an annular building form having a smooth transversely straight periphery for supporting a belt during the building and curing thereof. For convenience in building the belt, the building form may be supported from a rotatable spindle 11 by a suitable chuck, as for example by the removable flanges such as the peripherally shouldered discs 12, 13 clamped to each other by a nut 14 threaded upon the spindle 11, the building form being clamped between the discs and seated upon their shoulders. The building form 10 is preferably of metal and its belt supporting face is at least equal in width to the wider or outer face of the desired belt.

To provide for seating the tension members and other material accurately upon the building form, the discs 12, 13 are provided with flanges 12a, 13a, which extend radially beyond the peripheral face of the building form and defined therewith a shallow peripheral groove of substantially the desired width of the belts. The flanges 12a, 13a, are relatively thin so as not to be in the way of stitching tools used to form the covering material outwardly along the lateral faces of the belt. The discs 12, 13 may be clamped to the building form by any convenient means such as the nut 14 and spindle 11.

The belt is built about the building form in inverted or reversed position. For this purpose a strip 15 of belt covering material, such as bias laid rubberized square woven fabric is first laid about the periphery of the form in centered relation thereto, and spliced thereabout. The tension material, such as cotton, nylon, or rayon cord, or metallic wire or cable is then laid under tension about the cover material, preferably in a single layer of adjacent convolutions entirely across the face of the form 10 and between the flanges 12a, 13a. As the form supports the tension members only through the cover fabric material, the cords or wires are readily laid in their desired positions between flanges 12a, 13a without flow or distortion of flowable material thereunder or change of tension.

The compression portion 16 of the belt is preferably formed as an extruded strip of rubber-like material of wedge-like cross-section and is laid about the form with its wider side against the tension layer and then spliced in place. The margins of the cover 15 are then formed, as by use of a stitching roller outwardly along the side driving faces and the narrow bottom face of the belt where its margins are preferably overlapped. This completes the assembly of the belt before vulcanization and the annular building form with the assembled belt thereon may be removed from the supporting spindle 11 and may be stored if desired prior to vulcanization of the belt without distortion of the belt or shrinkage of its material.

For curing or vulcanizing the belt, annular mating mold members 20, 21, 22, 23, 24 are provided having annular cavities formed therebetween for seating and receiving the annular building forms or rings 10 and the belts thereon in the position in which the belts were assembled. The rings 10 with the belts thereon are assembled between the mold rings 20 to 24 and are seated upon piloting portions 20a, 21a of the mold rings for centering them and are subjected to heat and pressure to vulcanize the belts. This may be accomplished by placing the mold assembly in an open steam vulcanizer having a hydraulic ram for pressing the molds or by placing the molds between heated press platens and applying pressure thereto until vulcanization is complete.

After vulcanization of the belts, the rings 10 and the belts are removed from the mold plates and the belts are removed from the rings 10. The belts may then be turned inside out or reversed to bring the tension members to the outer side of the belt. To relieve compression of the inner part of the belt as a result of the reversal, the inner side of the belt may be notched by removing transverse portions of the rubber-like body of the compression portion from the belt.

Where it is desired to provide a belt with a transversely arched layer of tension elements and a correspondingly arched outer face as in the belt of Fig. 6, an annular building form 40, shown in Fig. 5 is employed. The building form or ring 40 has a concave shallow channel 41 about its periphery corresponding in curvature to the desired contour of the belt surface. The fabric covering material is laid about the building form in the manner described in making the flat-topped belt of Fig. 4. With this building form, as with the building form of Fig. 1, supporting discs 42, 43 are provided for seating and supporting it while the material is placed thereon and these discs have thin flanges 44, 45 extending radially beyond the peripheral face of the ring to serve in guiding the application of the tension material. To avoid sharp edges, the ring 40 is preferably made wider than the concave peripheral belt seat to provide cylindrical margins 46, 47 at each side thereof, and the flanges 44, 45 are formed with inwardly offset margins 48, 49 overhanging the cylindrical margins.

The tension members are laid in place over the fabric cover and take the arched contour of the central portion of the building form. The belt is then completed by applying the rubber-like material of the compression portion, forming the covering thereabout, and curing the belt on the building form between mold plates. After vulcanization the belt may be notched and turned inside out to bring its arched tension layer to the outer face of the belt.

In the manufacture of either of the illustrated examples of V-belts, the contour of the ring building form determines accurately the position of the tension members in the finished belt and the relation of these tension members to the other parts of the belt is not disturbed thereafter during vulcanization of the belt, so that each tension element is in position to assume its desired load in use of the belt, resulting in high efficiency and long belt life.

The ring building form, which is individual to each belt and supports it during all of the building, handling and vulcanizing operations, moreover greatly facilitates handling operations without injurious distortion of the material.

Variations may be made without departing from the scope of the invention as it is defined by the following claims.

We claim:

1. Apparatus for making an endless V-belt, said apparatus comprising an annular building form for building the belt individually, said form having a width substantially equal to the wider outer face of the desired belt and having between its marginal edges an outer peripheral molding face substantially coextensive in width with said width of the form for supporting such wider outer face of the belt in contact therewith during the building and vulcanizing operations, and mold members having piloting portions engageable with said building form for centering them therewith and having outwardly converging side faces disposable at said marginal edges of the form for receiving said form and belt and defining with the form a mold cavity of the desired belt shape inverted in cross-section.

2. Apparatus for making an endless V-belt having an outer face convex in cross-section, said apparatus comprising an annular building form for building the belt individually, said form having a width substantially equal to the wider outer face of the desired belt and having between its marginal edges an outer peripheral molding face substantially coextensive in width with said width of the form and of concave cross-sectional shape for supporting such wider outer face of the belt in contact therewith during the building and vulcanizing operations, and mold members having piloting portions engageable with said building form for centering them therewith and having outwardly converging side faces disposable at said marginal edges of the form for receiving said form and belt and defining with the form a mold cavity of the desired belt shape inverted in cross-section.

3. Apparatus for making an endless V-belt, said apparatus comprising an annular building form for building the belt individually, said form having a belt-supporting periphery of a width at least equal to the wider outer face of the desired belt and having between its marginal edges an outer peripheral molding face substantially coextensive in width with said width of the form for supporting such wider outer face of the belt in contact therewith during the building and vulcanizing operations, and a pair of removable flange members having piloting portions for concentrically aligning them with said building form and peripheral edges extending radially beyond said molding face of the building form at the margins thereof providing shallow shoulders for flanking a belt supported on the form in contact therewith while exposing the sides of the belt for manipulation during the building of the belt.

4. Apparatus for making an endless belt as defined by claim 3 in which the peripheral edges of the flange members radially beyond the periphery of the building form are of convex cross-section.

5. Apparatus for making an endless belt as defined by claim 3 in which the peripheral edges of the flange members radially beyond the periphery of the building form are provided with offset shoulders overlying the edges of said form a relatively slight amount.

6. Apparatus for making an endless V-belt having an outer face convex in cross section, said apparatus comprising an annular building form for building a belt individually, said form having a width at least equal to the wider outer face of the desired belt and having between its marginal edges an outer peripheral molding face substantially coextensive in width with said width of the form having a peripheral groove of arched cross-section corresponding to the cross-section of the desired belt for supporting the wider outer convex face of the belt in contact therewith during the building and vulcanizing operations, and mold members having piloting portions engageable with said building form for centering them therewith and having outwardly diverging side faces disposable at said marginal edges of the form for receiving said form and belt and defining with the form a mold cavity of the desired belt shape inverted in cross-section.

JOHN L. FIHE.
JAMES W. HUFF.

REFERENCES CITED

The following references are of record in the file of this patent:

UNITED STATES PATENTS

| Number | Name | Date |
|---|---|---|
| 1,354,738 | Gates | Oct. 5, 1920 |
| 1,805,032 | Berwick | May 12, 1931 |
| 1,813,876 | Gerstenslager | July 7, 1931 |
| 1,969,067 | Freeman | Aug. 7, 1934 |
| 1,971,697 | Schieren | Aug. 28, 1934 |
| 2,194,833 | Nassimbene | Mar. 26, 1940 |
| 2,442,037 | Carter et al. | May 25, 1948 |